T. D. McCALL.
COOKING VESSEL.
APPLICATION FILED MAR. 13, 1908.
1,093,282.
Patented Apr. 14, 1914.
3 SHEETS—SHEET 1.
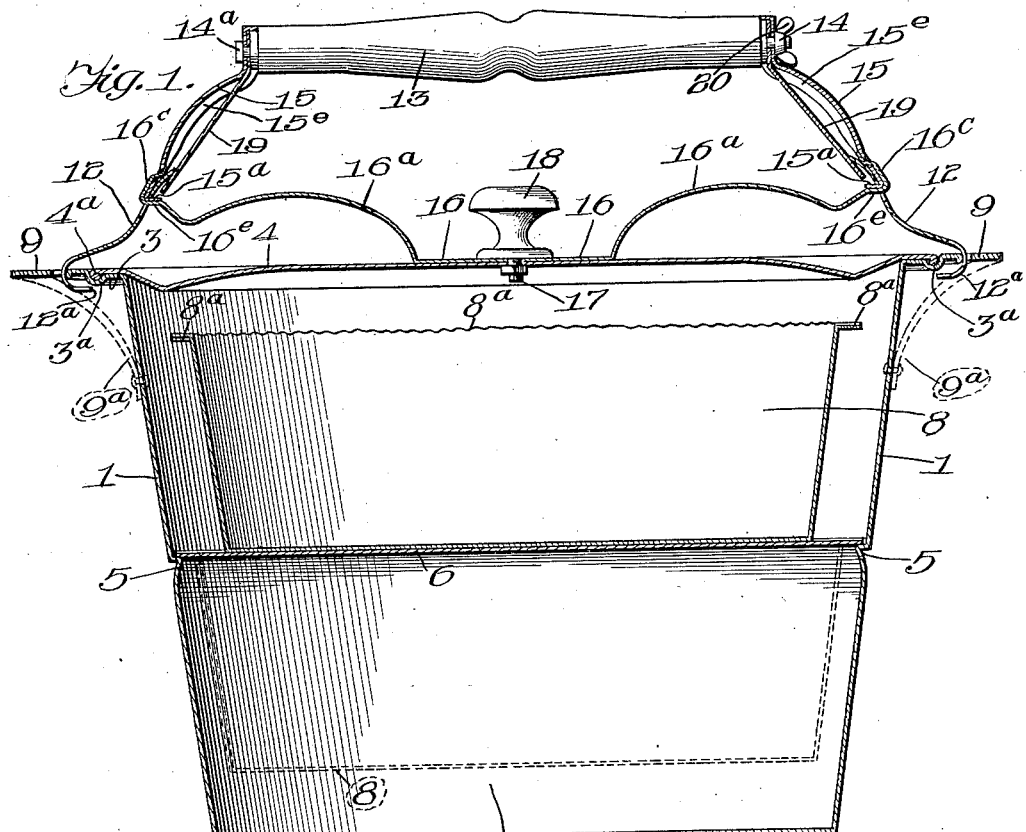

T. D. McCALL.
COOKING VESSEL.
APPLICATION FILED MAR. 13, 1908.
1,093,282.
Patented Apr. 14, 1914.
3 SHEETS—SHEET 2.
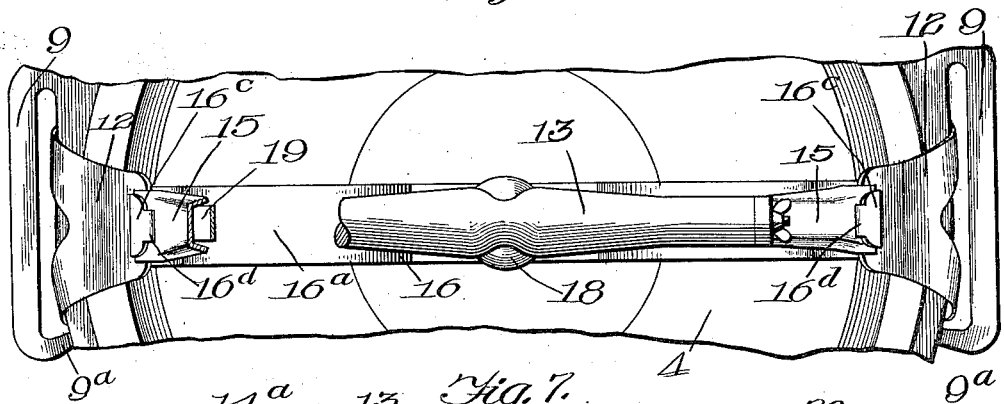
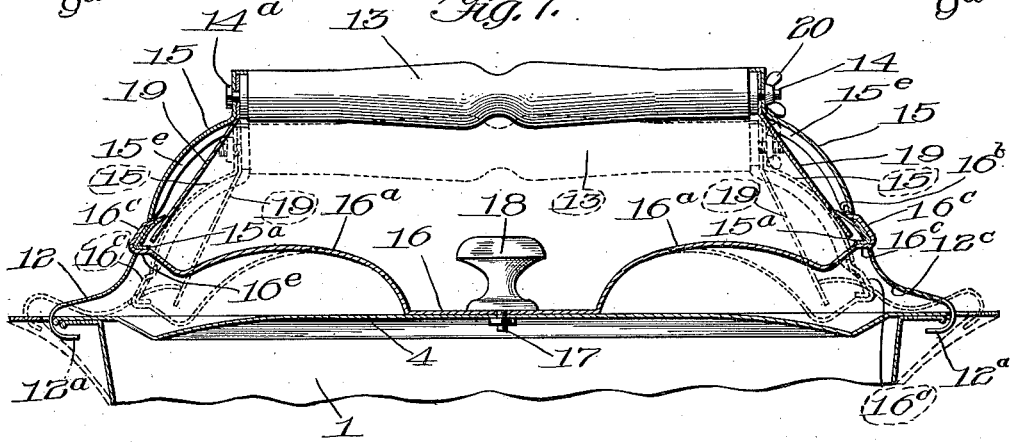
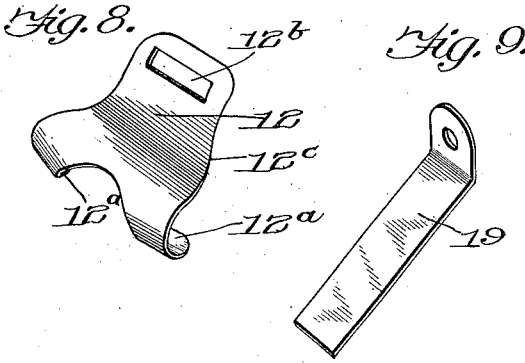
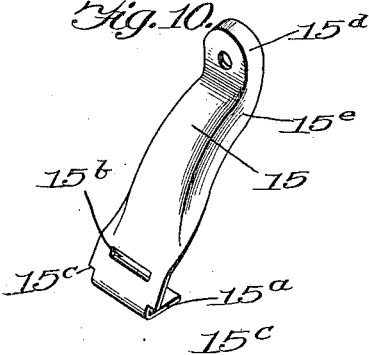
Witnesses:
Inventor:
T. D. McCall
By Brown & Hopkins
Attys.

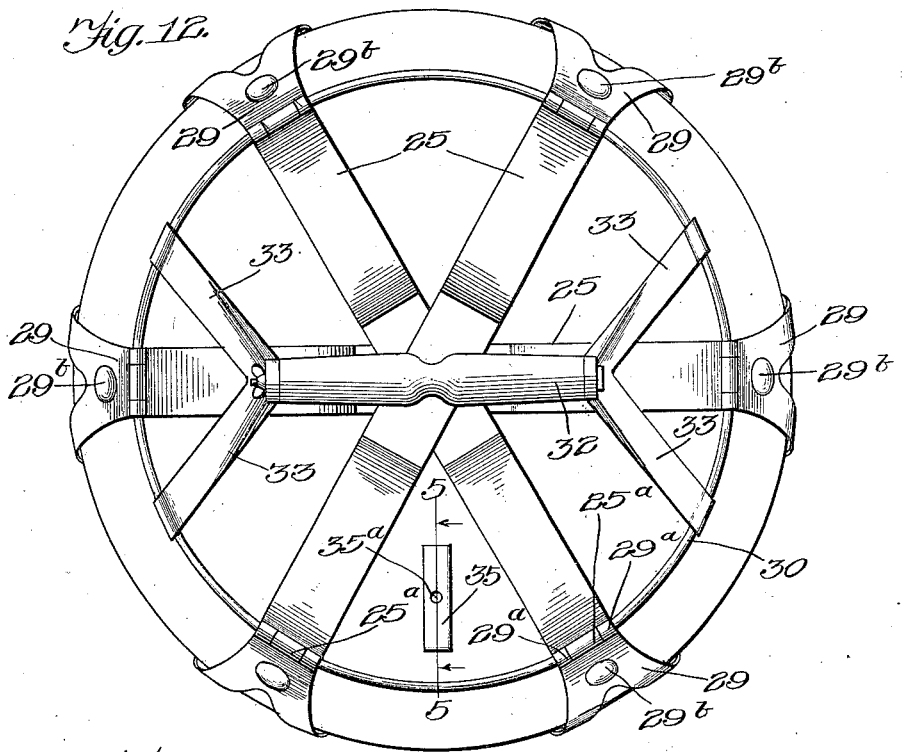
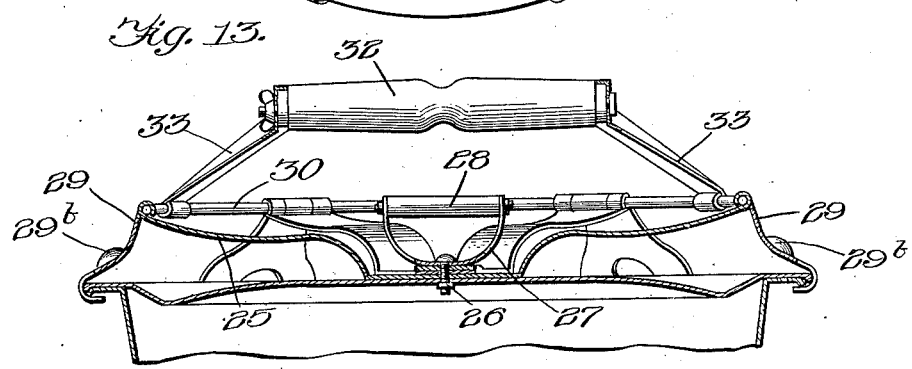
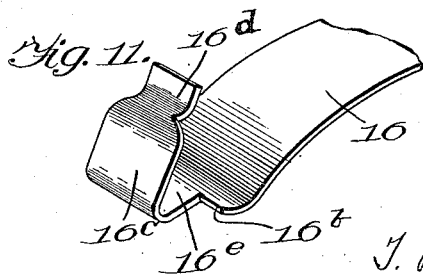

UNITED STATES PATENT OFFICE.

THADDEUS D. McCALL, OF CHICAGO, ILLINOIS.

COOKING VESSEL.

1,093,282.  Specification of Letters Patent.  Patented Apr. 14, 1914.

Application filed March 13, 1908. Serial No. 420,821.

*To all whom it may concern:*

Be it known that I, THADDEUS D. McCALL, citizen of the United States, residing at Chicago, in the county of Cook and State of Illinois, have invented certain new and useful Improvements in Cooking Vessels, of which the following is a full, clear, and exact specification.

The invention relates to cooking vessels adapted for cooking various kinds of food and the like, and has for its primary object to provide an improved form of closed vessel that is adapted to cook foods in a more satisfactory manner and with a less expenditure of fuel than in the ordinary form of devices of this character.

A further object of the invention is to provide an improved form of rim around the top of the vessel of the class described adapted to coöperate with a cover in forming a complete closure for the vessel in order to maintain to a greater extent than common with such devices the steam and heat generated within the vessel.

A further object of the invention is to provide an improved form of receptacle cover capable of firm attachment to a vessel of the class described.

To the attainment of these ends and the accomplishment of other new and useful objects, as will appear, the invention consists in the features of novelty in the construction, combination and arrangement of the several parts hereinafter more fully described and claimed and shown in the accompanying drawings, illustrating an exemplification of this invention and in which—

Figure 1 is a vertical view of the preferred form of vessel embodying the various features of the invention. Fig. 2 is a plan view of the vessel as it appears in Fig. 1, except that the cover or lid is shifted slightly in order to indicate the manner in which the cover and associated parts are designed to operate in draining the vessel. Fig. 3 is a plan view of a portion of a metallic disk for use on the interior of the vessel for supporting an interior pan or vessel, the view being designed to show the manner in which the disk is corrugated adjacent its periphery in order to permit openings for the escape of the steam or gases generated within the vessel beneath such disk. Fig. 4 is a view in elevation of the parts shown in Fig. 3. Fig. 5 is a detail sectional view illustrating the construction of the signaling device as it appears mounted on the cover and is taken on line 5—5, Fig. 12. Fig. 6 is an enlarged plan view, with the parts broken away, adapted to show in detail the construction of the cover and means for securing the same in position on the top of the vessel. Fig. 7 is a view in side elevation partly in section of the parts shown in Fig. 6. Figs. 8, 9, 10 and 11 are detail views in perspective of parts of the cover. Fig. 12 is a plan view of a modified form of the device adapted for more firmly securing the cover on the vessel. Fig. 13 is a view in elevation partly in section of the device as illustrated in Fig. 12.

In carrying out the invention, any common form may be given to the vessel but the preferred form is that illustrated in Fig. 1 in which the general form of the vessel is that of the inverted frustum of a cone, the walls being indicated by the reference character 1. 2 is the bottom and 3 is the rim. It is preferred that the rim be constructed as illustrated in Fig. 1 to have a beaded or depressed portion or groove extending entirely around the rim as indicated by the reference character 3ª. This groove is adapted to coöperate with the ordinary beaded peripheral edge 4ª of the cover 4. By this construction the vessel becomes in use practically gas or steam tight, for the groove 3ª will retain water which condenses during the escape of steam from the vessel during the cooking operation. The walls 1 of the vessel are preferably provided with an indented portion extending entirely around the vessel as indicated at 5. The ledge on the upper side of this indented portion serves as a means of supporting disk 6, which has the material in its edge adjacent its periphery corrugated as illustrated at 6ª, Figs. 3 and 4. It will be seen that when the disk 6 is placed in position on the ledge formed by the indented portion 5 in the walls of the vessel, this corrugated peripheral portion will afford means for the escape of steam from that portion of the vessel below the disk, which section of the vessel is indicated in Fig. 1 by the reference character 7. Therefore it will be seen that by this mode of construction the vessel may be divided into as many compartments as may be desired by increasing the number of disks and the indentations in the walls of the vessel for supporting the same. If one kind of food, therefore, be placed in the compartment or division 7 of the vessel, the disk 7 will support another suitable pan or vessel as illustrated in Fig. 1 by the reference character 8. Into this interior vessel 8 food of another kind may be introduced and the cooking of both kinds of food progresses at the same time. When it is desired to use the vessel solely as a steam cooker, the disk 6 may be removed and practically the entire capacity of the vessel utilized by causing the interior pan or vessel 8 to be depressed until its rim $8^a$ comes in contact with the ledge on the indented portion 5 in the sides of the outer vessel. In order to provide means for the escape of steam below the pan 8 under such conditions, the rim $8^a$ thereof is corrugated in the same manner as the peripheral portions $6^a$ of the disk 6 as illustrated in Figs. 3 and 4.

With the improved form of lid and the devices by which the same is secured to the top of the vessel, the loss of steam in cooking is minimized as the vessel is practically steam and water tight. This is true to an extent that it is somewhat difficult to drain the vessel without sliding the lid until it assumes the position with reference to the top of the vessel as illustrated in Fig. 2. The grooved rim 3 of the vessel for drainage purposes is therefore preferably provided with side members 9, as illustrated in Figs. 1 and 2. These members are preferably formed integral with the rim, being cut or stamped from the same material as the body and rim of the vessel but so shaped that they have one free end $9^a$ which may be formed as illustrated in Figs. 1 and 2 by bending the same downwardly and securing it by riveting or in any suitable manner, to the sides of the vessel. It will be seen that the body portions of the members 9 are on diametrically opposite portions of the exterior of the rim 3 and have their main body portions parallel with each other, thus enabling the hooks which secure the lid to the vessel to be held in position, securing the lid to the rim, as shown in Figs. 1 and 2, since they prevent the hooks from being separated from the peripheries of the lid and the rim of the vessel. In order to provide for readily draining the vessel, the spout 10 is preferably constructed in a position illustrated in Fig. 2 on the rim of the vessel and a suitable handle 11 is also provided on the diametrically opposite side of the kettle adjacent the rim, both spout 10 and handle 11 being preferably formed integral with the rim 3 of the vessel.

The hooks which secure the cover in place on the top of the vessel are illustrated in detail in Fig. 8 and indicated by the reference character 12.

13 is a handle of any suitable material, preferably of wood. Secured to the ends of the handle by means of a rod or bolt 14 are the members 15 which extend downwardly and outwardly from the ends of the handle and are shown in detail in Fig. 10.

16 is a suitable elastic member formed preferably of a piece of flat steel and rigidly secured to the cover 4 by the bolt 17 which is provided with a threaded portion and a nut and which also is utilized as the means for securing a suitable knob or handle 18 to the cover on the top of the spring. The spring 16 on either side of its central portion where secured to the cover is curved with its convex side upward and away from the cover as indicated at $16^a$ for a purpose to be hereinafter described.

The ends of the spring 16 are formed as shown in detail in Fig. 11. The manner in which the flat metal of the spring is curved adjacent the ends is illustrated more clearly in the sectional views in Figs. 1 and 7. Adjacent the ends of the spring the material is cut away forming the shoulders $16^b$ and the narrowed portion $16^c$, which part is further cut away at the outward extremity to form the tongue $16^d$. The purpose of this peculiar formation of the spring 16 will be apparent by examining the manner in which the parts are asembled as shown in Figs. 1 and 7. It will be seen that the hook members 12 are provided at their outer extremity with curved portions $12^a$ adapted for insertion on the under side of the rim of the vessel and that near the inner end the member 12 is provided with an elongated slot $12^b$ adapted to be inserted over the tongue $16^c$ of the spring and this slot is of such length that the member 12 finds a bearing against shoulders $16^b$. The slot $12^b$ of the member 12 is of sufficient width to permit the tongue $15^a$ on the members 15 which extend downwardly from the handle to be passed through it, so that a pivotal bearing is provided for hooks 12 on the top of the bent up portion $15^a$. This part it will be seen is narrowed, forming the shoulders $15^c$ so that the member 12 while pivotally secured to the parts is yet held within fixed limits and cannot become disengaged unless some of the parts are removed. Flat springs 19, as shown in detail in Fig. 9, having one end deflected and perforated, are held in position beneath the members 15 by inserting them over the threaded bolt or rod 14 between the members 15 and the ends of the handle 13. The parts are then clamped in position by the insertion of a suitable nut, as the thumb nut 20, one end of the rod or bolt being headed as indicated at $14^a$. The ferrules $15^d$ formed on the upper ends of members 15 serve as a protection for the ends of the handle and the same, together with side flanges $15^e$ also forms a housing or protective covering for springs 19 and also serve as strengthening means for the brackets.

The lower ends of the short springs 19 normally bear against the extreme upper ends of the hook members 12 and serve to hold these hook members normally in such position that they tend to approach the peripheries of the cover and the rim of the vessel to hold the cover in position. The angle given to tongue 15$^a$ is such that hook member 12 cannot be rocked to get the portion bearing against spring 19 on a dead center. Spring 16 is formed at 16$^e$ to parallel and support tongue 15$^a$. Reference has already been made to the upwardly curved portions 16$^a$ of the large flat spring 16 and these parts of the spring are so formed in order that the spring may be flexed or bent without causing the ends of the spring to change their relative positions with respect to the fixed lower ends of the fixed members 15 and so preventing the binding of these parts. The outer narrowed portions of the spring 16 as indicated at 16$^c$ beyond the shoulders 16$^b$ are bent upwardly and the tongue 16$^d$ on the outer extremity is inserted through the slot 15$^b$ and extended for a short distance along the inside of the member 15, thus firmly attaching the parts together. If it were not for this peculiar shape given to the spring 16 it will be seen that when the handle 13 is forced downwardly to operate the device, the consequent lengthening of the spring 16 would cause the device to be inoperative. The hook members 12 have their main body portion deflected downwardly near their middle and forming a bearing portion, as indicated at 12$^c$, adapted to coöperate with the upper surface adjacent the outer edge of the cover, so that when the handle 13 is depressed and the parts operated to the position indicated in dotted lines in Fig. 7, these hooks will be forced outwardly and upwardly and the hook portions 12$^a$ will become disengaged from the under edge of the rim of the vessel thus allowing the cover to be disengaged from the vessel.

A modification of the form of cover just described is shown in Figs. 12 and 13, consisting of a multiplicity of the hooks which correspond to the members 12, as illustrated in Fig. 8. This form of the device is particularly applicable for use on vessels or on railroad trains where the movement of the vessel or car is liable to upset a cooking vessel. With the cover of the vessel secured in position by a number of these hooks on a cover, the contents of the vessel will not be lost should the vessel be accidentally overturned for the lid will be securely held in position. In this modification of the invention three springs, indicated by the reference character 25, are employed, although it will be apparent that any number of such springs may be used. They are preferably secured one above the other at the center of the cover by a suitable threaded bolt 26 which also secures in position a modified form of handle comprising the U-shaped member 27 which has the member 28 secured between the upper extremities thereof. This forms a more convenient and efficient means for grasping the cover and for operating the increased number of springs in the device and is a convenient feature of this modification of the invention, since it is more difficult to operate because of this increased resistance of the springs. The upper ends of the hook members 29 are pivotally secured to the outer ends of the spring members 25, the circular rod or wire 30 serving as a common pivot pin for joining each of the hook members to the outer end of its associated spring, and bearings for the pintle or pivot member 30 may be formed by bending tongues, as illustrated at 25$^a$ around the wire 30 and the material in the hook member 29 may be cut away to provide tongues 29$^a$ to be formed likewise around the rod or wire 30 at the ends of the tongue bearings 25$^a$. In this modification of the invention the flat springs for normally holding the hook members down in engagement with the rims of the cover and vessel are not used but the hook members 29 may be held down into position by means of portions of solder or other suitable material secured to them, as illustrated at 29$^b$, when it is desirable to provide means otherwise than the weight of the parts to hold them downwardly into position. The hooks 29 are caused to operate as the hooks 12 before referred to by having their main body portions deflected downwardly forming the usual surfaces for bearing against the upper surface of the cover near its periphery. A suitable handle for operating the device is provided as illustrated at 32 and at the ends of this handle the branching members 33 extend downwardly and are secured at their lower ends to the circular rod or wire 30.

In the use of this improved form of cooking vessel in which it is possible to retain the steam coming from the foods during the process of cooking, it is found that there is a considerable saving of fuel since when a suitable degree of heat is given to the contents of the vessel, the heat may be readily retained for a longer time than if the steam is allowed to pass freely from the vessel as is the case when no provision is made for firmly securing the cover. In order that there may be the most economical use of fuel with the vessel, it is desirable that the heat be carefully regulated. To attract the attention of persons using the vessel, a signal is provided designed to be operated by the pressure of the steam within the vessel. This is in the form of a whistle indicated by the reference character 35, Figs. 2 and 5, secured to the cover 4 or to any suitable part of the vessel.

35ᵃ is a vent in the top of the whistle 35 and 35ᵇ is an opening in the bottom of the whistle adapted to register with a similar opening (not shown) in the walls of the vessel or the cover of the vessel. Since this whistle may be of any desired or suitable construction no further description of the same is deemed necessary. When this signaling device is used the attention of the operator will be attracted when the materials being cooked become heated beyond the desired degree and fuel will then be saved by reducing the amount of heat so that the materials will cook under a degree of heat where the steam pressure is not sufficient to cause the signal to sound.

I claim—

1. In a cooking vessel, in combination, a peripheral rim on the upper edge of the walls of the vessel, a lid or cover provided with a movable handle, clutching means pivotally connected with the said movable handle, elastic means interposed between the handle and the cover, said elastic means normally tending to separate the said handle and cover to cause the clutching means secured to the handle to engage the periphery of the cover and the rim of the vessel, a beaded portion extending around the periphery of the cover, and a trough or groove in the peripheral rim adapted to coöperate with the beaded periphery of the lid or cover.

2. In a cooking vessel, in combination, a cover, an annular flange or rim on the vessel adapted to coöperate with the cover, clamping means mounted on the cover and secured thereto comprising hooked members adapted to be adjusted over the edge of the cover and the flange or rim of the vessel, and means for securing the said clamping means against accidental displacement from its adjusted position, comprising a plurality of guide members adjacent each of said clamping means, said guide members being formed integrally with the flange or rim of the vessel and extending approximately parallel with the periphery of said flange or rim.

3. In a cooking vessel, in combination, a cover, an annular flange or rim on the vessel adapted to coöperate with the cover, elastically controlled clamping means mounted on the cover and adapted to clamp the cover on the flange or rim of the vessel, means for guiding the clamping means in position on the vessel, said last mentioned means comprising diametrically disposed ears formed integral with the rim or flange of the vessel and provided with approximately parallel guide slots adapted to receive the said clamping means, and a discharge or drain spout formed integral with said rim or flange.

4. In a device of the character described, the combination with a cover, of a movable handle, a pair of depending brackets secured to said handle, hooks pivotally connected with said brackets, extensions on said hooks beyond their pivotal connections with the brackets, springs engaging said extensions on the hooks and bearing thereon and tending to force them inwardly, and a spring secured to the cover and having its free ends connected with the brackets.

5. In a device of the character described, the combination with a cover, of a movable handle, a pair of depending brackets secured to the handle, hook members pivotally connected with said brackets, elastic means secured to the cover and operatively connected with said handle and brackets and controlling the movement thereof, means formed integral with said hook members adapted to engage the periphery of the cover and the walls of a vessel, and means for normally depressing the engaging ends of said hook members.

6. In a device of the character described, the combination with a cover, of a movable handle, comprising an elongated member, a pair of brackets provided with thimbles or ferrules on the upper ends thereof, means for securing the thimbles or ferrules of the brackets to the ends of the handle, hooks pivotally connected with the brackets, springs secured in position between said handle and brackets and in engagement with the extensions on the hooks beyond their pivotal connections with the brackets and elastic means interposed between the cover and the brackets.

7. In a device of the character described, the combination with a cover, of a movable handle, a pair of depending brackets secured to the handle, hooks pivotally connected with said brackets, and having extensions beyond their connections with the brackets, springs secured in position between said handle and said brackets and adapted to coöperate with the extension on said hooks to force them downwardly in engagement with the cover, and elastic means comprising a flat spring secured near the center thereof to the cover and having its free ends connected with the brackets.

8. In a device of the character described, the combination with a cover, of a movable handle, a pair of depending brackets secured to said handle, hooks pivotally connected with said brackets, there being a slot formed in the upper extremities of said hooks and a hooked portion at the lower extremity of the bracket adapted to receive the slot in the hook, and elastic means interposed between the cover and the brackets comprising a flat spring, the free ends of said spring being reduced to form tongues and coöperating shoulders, the said tongues being inserted through the slots in the hooks and bent upwardly and secured to said brackets.

9. In a device of the character described, a movable handle comprising an elongated member and depending portions or brackets on the ends thereof, hooks pivotally connected with the depending portions of said handle, and elastic means secured to the cover and to the depending portions of the handle, said elastic means comprising a flat spring secured near the center thereof to the cover and having body portions on each side of the point of its attachment to the cover formed upwardly and away from the cover in a curve presenting a concave surface on its face adjacent the cover and extending thence to the depending portions or brackets on the handle.

In testimony whereof I have signed my name to this specification, in the presence of two subscribing witnesses, on this 5th day of March A. D. 1908.

THADDEUS D. McCALL.

Witnesses:
M. W. CANTWELL,
A. L. SPRINKLE.

---

Copies of this patent may be obtained for five cents each, by addressing the "Commissioner of Patents, Washington, D. C."